(12) United States Patent
Iwai et al.

(10) Patent No.: US 6,230,580 B1
(45) Date of Patent: *May 15, 2001

(54) INDUSTRIAL MANIPULATOR AND A METHOD OF CONTROLLING THE SAME

(75) Inventors: Seiji Iwai, Kawanishi; Yasushi Mukai, Osaka; Kazunori Matsumoto, Ibaraki, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,839

(22) Filed: Jun. 19, 1997

(30) Foreign Application Priority Data

Jun. 20, 1996 (JP) .................................................. 8-159371

(51) Int. Cl.[7] .............................. B25J 17/00; B25J 11/00; B66C 23/00
(52) U.S. Cl. .......................... 74/490.1; 74/490.5; 901/41; 414/680
(58) Field of Search ............................ 74/490.03, 490.01, 74/490.05; 901/41, 15, 23; 414/680; 901/22, 28

(56) References Cited

U.S. PATENT DOCUMENTS

| 3,922,930 | 12/1975 | Fletcher et al. | 74/665.8 |
| 4,973,215 | 11/1990 | Karlen et al. | 414/729 |
| 5,606,235 | 2/1997 | Mauletti | 74/490.01 |

OTHER PUBLICATIONS

D1: Motoman L15 Torsteknik, Torsteknik AB, Oct. 3, 1986*, Torsas. This date is the date statedby the Swedish Patent Office, and appears to corrospend to the phrase, "Reg. C03–10–86" found at the bottom right hand corner of the last page of the document. However, this does not constitute an admission with respect to the publication date of the document.

Primary Examiner—David A. Bucci
Assistant Examiner—Colby Hansen
(74) Attorney, Agent, or Firm—Wenderoth, Lind & Ponack, L.L.P.

(57) ABSTRACT

A manipulator includes a first arm having a first reduction gear unit built therein, a second arm fitted through the first arm and having a second reduction gear unit built therein, and a third arm fitted through the second arm and having a third reduction gear unit built therein. To avoid any possible interference between, for example, a welding torch, and a portion of the manipulator during operation of the manipulator, the drive axis of the third reduction gear unit is spaced apart a distance from a drive axis of the second reduction gear unit.

9 Claims, 3 Drawing Sheets

INDUSTRIAL MANIPULATOR AND A METHOD OF CONTROLLING THE SAME

BACKGROUND OF THE INVENTION

1. (Field of the Invention)

The present invention relates to an industrial manipulator, particularly a manipulator wrist structure, and a method of controlling the manipulator.

2. (Description of the Prior Art)

Industrial manipulators are currently employed in various industries. Although manipulators are many in type, most of the manipulators largely employed to accomplish factory automation are of a type resembling a human hand, an example of which is shown in FIGS. 4 to 5C for discussion of the prior art to which the present invention pertains.

Referring particularly to FIG. 4, the prior art manipulator arm shown therein comprises a first tubular shell (a first driving articulate element) 31, a second tubular shell (a second driving articulate element) 35a, an intermediate tubular shell (a driven articulate element) 35b positioned between the first tubular shell 31 and the second tubular shell 35a and a third tubular shell (a third driving articulate element) 39 positioned adjacent one of the opposite ends of the second tubular shell 35a remote from the intermediate tubular shell 35b.

The first tubular shell 31 includes a first reduction gear unit 32 incorporated therein and having a first drive axis 33, and a first drive motor 34 housed within the first tubular shell 31 and drivingly coupled with an input side of the first reduction gear unit 32. The intermediate tubular shell 35b has one end coupled with an output side of the first reduction gear unit 32 and the opposite end coupled with the second tubular shell 35a.

The second tubular shell 35a includes a second reduction gear unit 36 incorporated therein and having a second drive axis 37, and a second drive motor 38 housed within the second tubular shell 35a and adapted to drive an input side of the second reduction gear unit 36 through a drive transmission element. On the other hand, the third tubular shell 39 includes a third reduction gear unit 40 incorporated therein and having a third drive axis 41, a third drive motor 42 housed within the second tubular shell 35a and drivingly coupled with an input side of the third reduction gear unit 40 through a drive transmission element.

The third tubular shell 39 has a safety holder 14 fixedly coupled with an output side of the third reduction gear unit 40 for carrying a welding torch 13 which can revolve together with the safety holder 14 about the third drive axis 41. The welding torch 13 is connected with a cable 15 having an electric power line, a conduit and a gas hose bundled together.

In order for the manipulator arm to allow the welding torch 13 to gain access to a workpiece of a relatively complicated shape during a welding operation without interfering with a manipulator wrist, the second and third tubular shells 35a and 39 must have a size as small as possible and, particularly, the dimension L3 shown in FIGS. 5B and 5C affects the accessibility of the welding torch 13 to the workpiece. Accordingly, how small the dimension L3 is designed is one of the factors determinative of the range of application in which the welding manipulator can be effectively utilized to accomplish an intended job. For this reason, the prior art manipulator is so designed and so configured that the first and second drive axes 33 and 37 lie perpendicular to each other; the second and third drive axes 37 and 41 lie perpendicular to each other; and both of the second and third drive motors 38 and 42 are housed within the second tubular shell 35.

The operation of the prior art manipulator arm of the structure discussed above will now be described with reference to FIG. 4.

When the first drive motor 34 drives the input side of the first reduction gear unit 32 accommodated within the first tubular shell 31, the second and intermediate tubular shells 35a and 35b rotate about the first drive axis 33 in one of the opposite directions shown by θ1. The third tubular shell 39 can rotate about the second drive axis 37 in one of the opposite directions shown by θ2 when the second drive motor 38 drives the input side of the second reduction gear unit 36, accommodated within the second tubular shell 35a, through the drive transmission element. On the other hand, when the third drive motor 42 drives the input side of the third reduction gear unit 40, accommodated within the third tubular shell 39, through the drive transmission element, the safety holder 14 carrying the welding torch 13 rotates about the third drive axis 41 in one of the opposite directions shown by θ3.

Accordingly, it is theoretically possible for the welding torch 13 to assume any position and/or orientation relative to the workpiece by suitably selecting and/or combining directions of movement θ1, θ2 and θ3.

However, in the prior art manipulator arm of the type discussed above, and so long as the freedom of movement in either of the opposite directions θ3 is concerned, the angle through which the safety holder 14 carrying the welding torch 13 can rotate relative to the third tubular shell 39 is limited and, thus, the prior art manipulator arm is necessarily incapable of continuously assuming an arbitrarily chosen orientation. This is because, in the case of the welding manipulator such as discussed above or a paint applying manipulator, the cable 15 extending outwardly from the welding torch 13 interferes with the second tubular shell 35a when the safety holder 14 rotates in one of the opposite directions θ3 about the third drive axis 41.

Considering that all of the second reduction gear unit 36, the second drive motor 38, the third drive motor 42, the drive transmission element connecting the second reduction gear unit 36 and the second drive motor 38 together and the drive transmission element connecting the third reduction gear unit 40 and the third drive motor 42 together are housed within the second tubular shell 35a, the second tubular shell 35a necessarily has a square outer appearance, that is, a generally rectangular sectioned shape, as shown in FIG. 5C. Accordingly, when the cable 15 interferes with the second tubular shell 35a, the cable 15 is considerably bent with its outer sheath 15a damaged and, consequently, weld padding tends to be considerably adversely affected.

By way of example, where a welding line along which welding is desired to be effected at the workpiece lies at a location shown by B in FIG. 4, the cable 15 when moved to a position shown by 13b about the third drive axis 41 interferes with the second tubular shell 35a and, accordingly no beautiful weld padding can be obtained. Thus, the prior art welding manipulator has a problem in that the position and/or orientation of the workpiece to be welded relative to the welding manipulator have been limited.

Moreover, when it comes to effecting a fillet welding continuously along a circular welding line 19 defined between a cylindrical workpiece 17 and a base plate 18 as shown in FIG. 6 to eventually form a circular fillet joint by which the cylindrical workpiece 17 is rigidly connected to the base plate 18, the welding torch 13 has to be revolved so as to follow the circular welding line 19. In this instance, even though the workpiece is disposed in an optimum layout, interference between the cable 15 and the second tubular shell 35a necessarily takes place and, consequently, no beautiful weld padding that continues along the circular welding line 19 can be obtained.

The foregoing problems discussed in connection with the welding manipulator are equally found in the paint applying manipulator.

In view of the foregoing, it is suggested to position the cable at a location distant from the second drive axis 37 and towards the third drive axis 41. However, to position the cable at a location distant from the second drive axis 37 may result in enhancement of an angular transmission error of any one of the first and second reduction gear units 32 and 36, which in turn brings about reduction in positioning accuracy with which the tip of the welding torch 13 is positioned relative to the welding line.

To downsize or eliminate a cable guard 15a which directly interferes with the second tubular shell 35a would adversely affect the freestanding property of the cable 15 to such an extent as to result in a severe bending of a welding wire bundled in the cable 15 which would in turn bring about an adverse influence on the eventually formed weld padding.

It may be contemplated to lessen the interference by downsizing the second tubular shell 35a. However, considering that all of the second reduction gear unit 36, the second and third drive motors 38 and 42 and the drive transmission elements connecting the second and third reduction gear units 36 and 40 respectively with the second and third drive motors 38 and 43 are housed within the second tubular shell 35a, the dimensions L2 and L3 shown in FIGS. 5A to 5C can no longer be reduced economically and rationally.

SUMMARY OF THE INVENTION

Accordingly, the present invention has been devised with an aim at substantially eliminating the problems inherent in the prior art manipulator of the kind discussed hereinbefore and is intended to provide an improved manipulator capable of performing an intended welding operation without allowing the cable to interfere with a portion of the manipulator, to thereby form a beautiful, stabilized weld padding.

It is a related object of the present invention to provide a method of controlling the improved manipulator of the type referred to above.

To this end, the present invention according to a broad aspect thereof provides a manipulator which comprises at least two manipulator arms each including a reduction gear unit built therein and having a respective drive axis. The drive axis of the reduction gear unit in one of the manipulator arms is uniquely displaced from the drive axis of the other of the manipulator arms. In a preferred embodiment of the present invention, the manipulator arm is comprised of a driving articulate element having the reduction gear unit built therein, and a driven articulate element coupled with the driving articulate element.

Preferably, the other of the manipulator arms has a tool fitted thereto for a particular job. Also, preferably, the drive axis of the reduction gear unit in such one of the manipulator arms is displaced from the drive axis of the reduction gear unit in such other of the manipulator arms a distance not smaller than the radial dimension of the reduction gear unit in such other of the manipulator arms.

A method of controlling the manipulator of the type referred to above comprises rotating one of the manipulator arms in one of vertical and horizontal directions, and rotating the other of the manipulator arms through an angle not smaller than 90° in the other of the vertical and horizontal directions, to thereby allow such one of the manipulator arms to approach a workpiece to be acted on.

Alternatively, the method of controlling the manipulator of the type referred to above may comprise rotating one of the manipulator arms in a direction away from a workpiece to be acted on, and rotating the other of the manipulator arms through an angle not smaller than 90° in a direction perpendicular to the direction in which such one of the manipulator arms is rotated, to thereby allow such one of the manipulator arms to approach the workpiece.

In a specific embodiment of the present invention, the manipulator comprises a first arm having a first reduction gear unit built therein, a second arm fitted through the first arm and having a second reduction gear unit built therein, and a third arm fitted through the second arm and having a third reduction gear unit built therein, wherein the third reduction gear unit has a drive axis displaced from a drive axis of the second reduction gear unit. In this specific embodiment, the first arm may be comprised of a driving articulate element having the reduction gear unit built therein, and a driven articulate element coupled with the driving articulate element, whereas the third arm may have a tool fitted thereto for a particular job.

In addition, in such specific embodiment, the drive axis of the third reduction gear unit is preferably (i.e. spaced apart) from the drive axis of the second reduction gear unit by a distance not smaller than the radial dimension of the second reduction gear unit.

When it comes to the control of the manipulator according to the specific embodiment of the present invention, the third arm is first rotated in one of vertical and horizontal directions, and the second arm is subsequently rotated through an angle not smaller than 90° in the other of the vertical and, to thereby allow the third arm to approach a workpiece to be acted on. Alternatively, the third arm may be rotated in a direction away from a workpiece to be acted on, and the second arm subsequently rotated through an angle not smaller than 90° in a direction perpendicular to the direction of rotation of the third arm, to thereby allow the third arm to approach the workpiece.

According to the present invention, the manipulator and the controlling method therefor outlined above and described in detail hereinafter are effective to avoid any possible interference between the tool, for example, a welding torch, and a portion of the manipulator during operation of the manipulator being, to thereby provide a beautiful, stabilized weld padding on the workpiece.

In addition, the second arm can have an outer dimension reduced to enhance the accessibility of the third arm to the workpiece to be welded.

BRIEF DESCRIPTION OF THE DRAWINGS

The present invention will become readily understood from the following description of a preferred embodiment thereof made with reference to the accompanying drawings, in which like parts are designated by like reference numeral and in which.

DETAILED DESCRIPTION OF THE EMBODIMENTS

Figure 1:
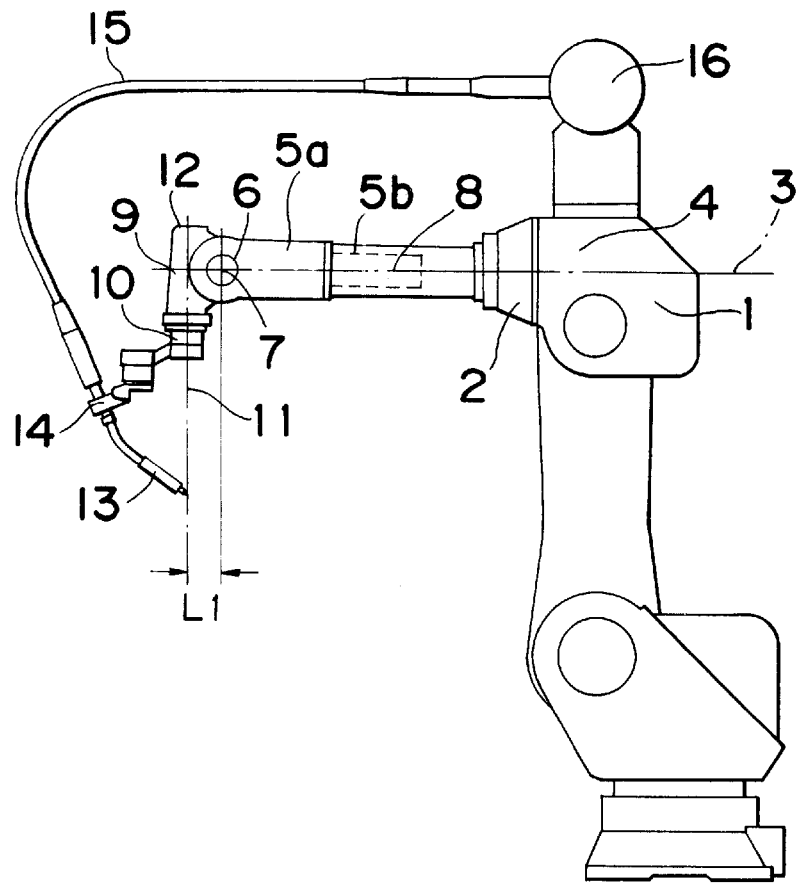
FIG. 1 is a schematic side view of a welding manipulator embodying the present invention, showing an outer appearance thereof.

Referring first to FIG. 1, there is shown a welding manipulator to which the present invention is applied for illustration purposes. The welding manipulator shown therein comprises a first arm constituted by a first tubular shell (a first driving articulate element) 1, and a second arm constituted by a second tubular shell (a second driving articulate element) 5a and an intermediate tubular shell (a driven articulate element) 5b positioned between the first tubular shell 1 and the second tubular shell 5a and a third arm constituted by a third tubular shell (a third driving articulate element) 9 positioned adjacent one of opposite ends of the second tubular shell 5a remote from the intermediate tubular shell 5b.

The first tubular shell 1 includes a first reduction gear unit 2 incorporated therein and having a first drive axis 3, a first drive motor 4 housed within the first tubular shell 1 and drivingly coupled with an input side of the first reduction gear unit 2. The intermediate tubular shell 5b has one end coupled with an output side of the first reduction gear unit 2 and the opposite end coupled with the second tubular shell 5a. It is to be noted that the intermediate tubular shell 5b is of a generally cylindrical shape having a smooth outer peripheral surface.

The second tubular shell 5a includes a second reduction gear unit 6 incorporated therein and having a second drive axis 7 lying perpendicular to the first drive axis 3, and a second drive motor 8 housed within the second tubular shell 5a in coaxial relation with the first drive axis 3 and adapted to drive an input side of the second reduction gear unit 6. On the other hand, the third tubular shell 9 includes a third reduction gear unit 10 incorporated therein and having a third drive axis 11, and a third drive motor 12 drivingly coupled with an input side of the third reduction gear unit 10.

The third tubular shell 9 has a safety holder 14 fixedly coupled with an output side of the third reduction gear unit 10 for carrying a welding torch 13 which can revolve together with the safety holder 14 about the third drive axis 11. The welding torch 13 and a control unit 16 therefor are connected with each other through a cable 15 which is a bundle of an electric power line, a conduit and a gas hose bundled together.

The second and third drive axes 7 and 11 are so positioned relative to each other that those drive axes 7 and 11 may lie perpendicular to each other, but may not lie in the same plane, having been offset a distance L1 from each other. In other words, the second tubular shell 5a and the third tubular shell 9 are so pivotally connected with each other that the third drive axis 11 of the third reduction gear unit 10 within the third tubular shell 9 can extend perpendicular to the second drive axis 7 of the second reduction gear unit 6 within the second tubular shell 5a, but be displaced a distance L1 from the second drive axis 7 in a direction away from the second tubular shell 5a.

Preferably, the drive axes 7, 11 of the second and third reduction gear units 6, 10 are spaced apart by the predetermined distance L1 which is not smaller than the radial dimension of the second reduction gear unit 6.

By this unique design, the third tubular shell 9 has an interior space available for accommodating therein the third drive motor 12 for driving an input side of the third reduction gear unit 10 and accordingly, the third drive motor 12 within the third tubular shell 9 is so disposed as to be directly coupled with the input side of the third reduction gear unit 10 in a manner coaxially of the third drive axis 11.

The operation of the prior art manipulator arm of the structure discussed above in accordance with the present invention will now be described with reference to FIG. 2.

Figure 2:
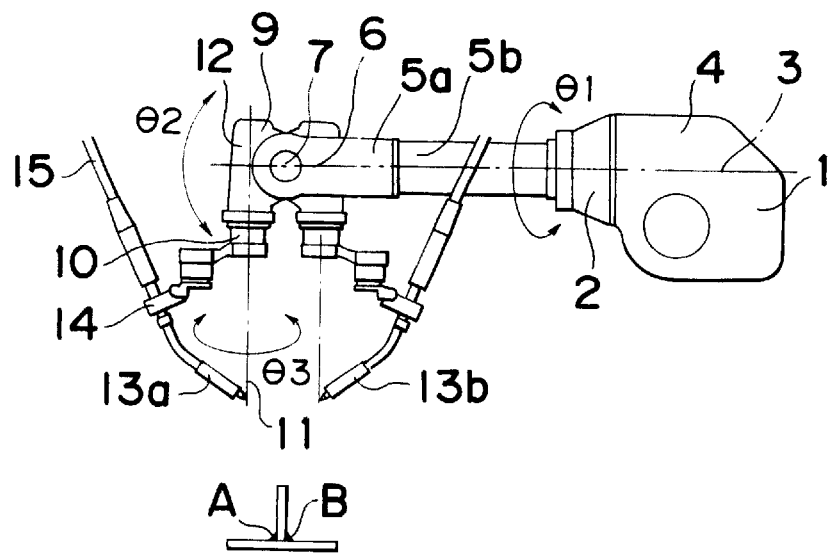
FIG. 2 is a fragmentary side view of the welding manipulator shown in FIG. 1, showing a manipulator arm thereof.

When the first drive motor 4 drives the input side of the first reduction gear unit 2 accommodated within the first tubular shell 1, the second and intermediate tubular shells 5a and 5b rotate about the first drive axis (or rotation axis) 3 in one of the opposite directions shown by θ1 (see FIG. 2). The third tubular shell 9 can rotate about the second drive axis 7 in one of the opposite directions shown by θ2 when the second drive motor 8 drives the input side of the second reduction gear unit 6, accommodated within the second tubular shell 5a, through a drive transmission element. On the other hand, when the third drive motor 12 drives the input side of the third reduction gear unit 10, accommodated within the third tubular shell 9, the safety holder 14 carrying the welding torch 13 rotates about the third drive axis 11 in one of the opposite directions shown by θ3. Accordingly, it is clear that the welding torch 13 can assume any position and/or orientation relative to the workpiece by suitably selecting and/or combining directions of movement θ1, θ2 and θ3.

By way of example, where a welding line along which welding is desired to be effected at the workpiece lies at a location shown by B in FIG. 2, the welding torch 13 can be brought to a position in the vicinity of the welding line B without the cable 15 interfering with the second tubular shell 5a, provided that the third tubular shell 9 is rotated about the second drive axis 7 in one of the opposite directions θ2 to thereby orient the welding torch 13 upwardly and the second tubular shell 5a is subsequently rotated at least 90° about the first drive axis 3 in one of the opposite directions θ1 to thereby bring the welding torch 13 to a position shown by 13b. Although at this time the cable 15 may interfere with the intermediate tubular shell 5b, neither is the cable 15 considerably bent nor its outer sheath damaged since the intermediate tubular shell 5b contains therein neither a drive transmission element nor a reduction gear unit and has a smooth outer peripheral surface.

Figure 6:
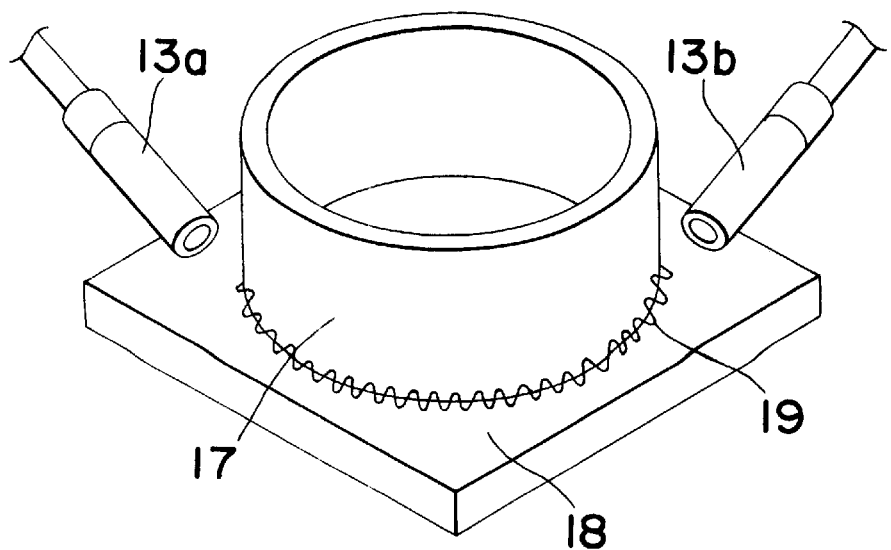
FIG. 6 is a schematic perspective view showing the relationship in position between a workpiece to be welded and the welding manipulator.

When it comes to effecting a fillet welding continuously along a circular welding line 19 defined between a cylindrical workpiece 17 and a base plate 18 as shown in FIG. 6 to eventually form a circular fillet joint by which the cylindrical work 17 is rigidly connected to the base plate 18, the welding torch 13 can be moved to the position shown by 13b by actuating the second and third tubular shells 5a and 9 in the manner described above and, in such case, even though the welding torch 13 then moved to the position 13b is moved so as to follow the circular welding line 19, the cable 15 does not interfere with the second tubular shell 5a, to thereby accomplish a continuous fillet welding along the welding line 19 to form a beautiful weld padding.

As hereinbefore described, by positioning the second and third drive axes 7 and 11 such that the drive axes 7 and 11 lie perpendicular to each other but do not lie in the same plane and are offset (i.e. spaced apart) a distance L1 from each other and by sequentially rotating the third tubular shell 9 so as to cause it to be orient upwardly and rotating the second tubular shell 5a at least 90° in a left or right direction to bring the third tubular shell 9 and the welding torch 13 to a position close to the workpiece to be welded, a continuous fillet welding can be accomplished along the circular welding line 19 to form a beautiful weld padding without allowing the cable 15 to interfere with the second tubular shell 5a even when the welding line 19 in the workpiece is positioned close to the manipulator arm.

Figure 3A:
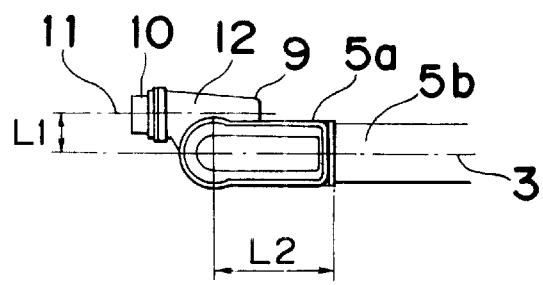
FIG. 3A is a fragmentary side view of the manipulator arm.
Figure 3B:
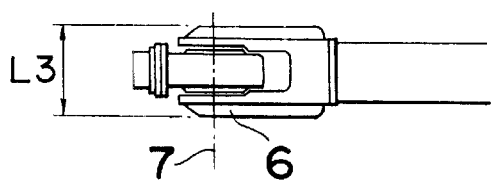
FIG. 3B is a fragmentary top plan view of the manipulator arm.
Figure 3C:
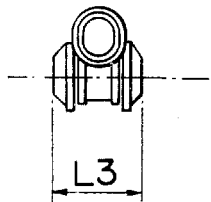
FIG. 3C is a fragmentary front view of the manipulator arm.
Figure 4:
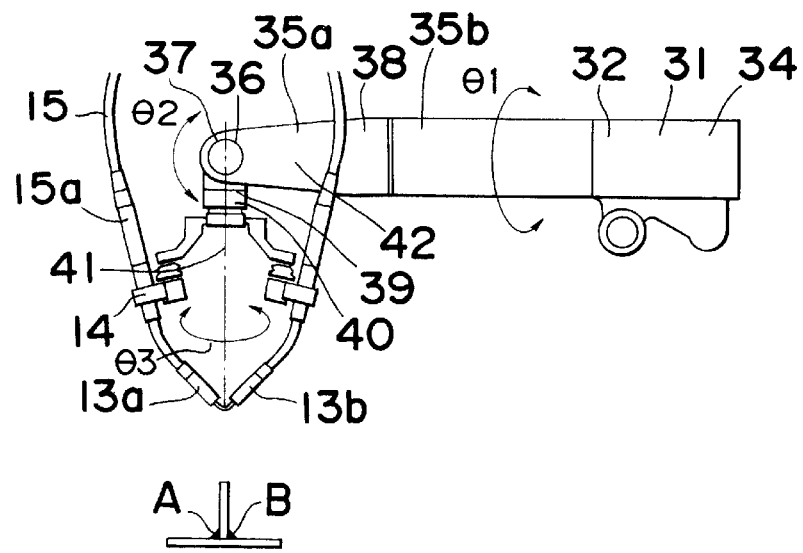
FIG. 4 is a side view of a prior art welding manipulator.
Figure 5A:
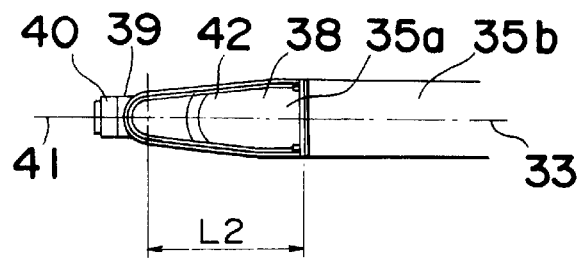
FIG. 5A is a fragmentary side view of a manipulator arm in the prior art welding manipulator.
Figure 5B:
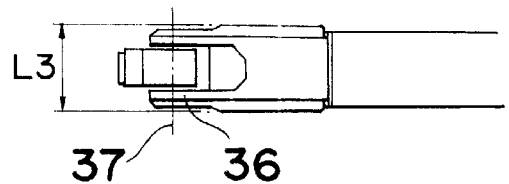
FIG. 5B is a fragmentary top plan view of the manipulator arm in the prior art welding manipulator.
Figure 5C:
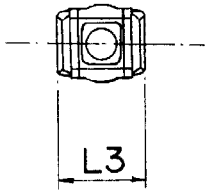
FIG. 5C is a fragmentary front view of the manipulator arm in the prior art welding manipulator.

Also, the arrangement in which the second drive motor 8 is disposed within the intermediate tubular shell 5b in coaxial relation with the first drive axis 3 and the third drive motor 12 is disposed within the third tubular shell 9 in coaxial relation with the third drive axis 11 in a manner coupled directly with the input side of the third reduction gear unit 10 is effective to reduce the outer dimensions (length and width) L2 and L3 of the second tubular shell 5a as shown in FIGS. 3A to 3C. Accordingly, even though the workpiece to be welded is of a complicated shape, the accessibility of the welding torch 13 to the intended welding line on the workpiece can advantageously be increased to thereby increase the welding performance of the welding manipulator remarkably.

Moreover, the direct connection of the third drive motor 12 with the third reduction gear unit 10 is advantageous in that no drive transmission element which would otherwise be necessary to connect the third drive motor 12 with the third reduction gear unit 10 can be eliminated, thereby resulting in reduction in noise level generated when the third drive axis is operated.

Although the present invention has been described in connection with the preferred embodiments thereof, it should be noted that various changes and modifications are apparent to those skilled in the art. By way of example, although in the foregoing embodiment of the present invention the manipulator arm has been shown and described as having the first to third driving articulate elements, that is, the first to third tubular shells, the present invention can be equally applicable where any other driving articulate element is employed on one side of the first driving articulate element opposite to the second driving articulate element.

Accordingly, such changes and modifications so far as encompassed by the appended claims are to be understood as included within the scope of the present invention.

What is claimed is:

1. A manipulator comprising:

a first arm having a first reduction gear unit provided therein, said first reduction gear unit having a first drive axis;

a second arm coupled to said first arm and having a second reduction gear unit provided therein, said second reduction gear unit having a second drive axis;

a third arm coupled to said second arm and having a third reduction gear unit provided therein, said third reduction gear unit having a third drive axis;

wherein said second drive axis is perpendicular to said first drive axis;

wherein said third drive axis is perpendicular to said second drive axis;

wherein said third drive axis is offset a predetermined distance from said second drive axis;

wherein said second drive axis and said third drive axis are non-coplanar; and wherein said first drive axis and said third drive axis are always coplanar.

2. The manipulator as claimed in claim 1, wherein said second arm comprises a driving articulate element having said second reduction gear unit therein, and a driven articulate element coupled with said driving articulate element.

3. The manipulator as claimed in claim 1, wherein said third arm has a tool fitted thereto for use in performing a particular job.

4. The manipulator as claimed in claim 1, wherein said predetermined distance is not smaller than a radial dimension of said second reduction gear unit.

5. A method of controlling the manipulator as claimed in claim 1, comprising rotating said third arm in one of vertical and horizontal directions; and rotating said second arm in the other of the vertical and horizontal directions, to thereby allow said third arm to approach a workpiece to be acted upon.

6. A method of controlling the manipulator as claimed in claim 1, comprising rotating said third arm in a first direction away from a workpiece to be acted upon; and rotating said second arm through an angle not smaller than 90° in a second direction perpendicular to said first direction, to thereby allow said third arm to approach the workpiece.

7. The manipulator as claimed in claim 1, wherein said third arm is elongated so as to always extend in the same direction as said third drive axis.

8. The manipulator as claimed in claim 7, wherein said second arm is elongated so as to always extend in the same direction as said first drive axis.

9. The manipulator as claimed in claim 1, wherein said second arm is elongated so as to always extend in the same direction as said first drive axis.

* * * * *